Jan. 12, 1965 M. L. CRIPE ETAL 3,165,327
LEVELING VALVE
Filed Oct. 2, 1961 3 Sheets-Sheet 1
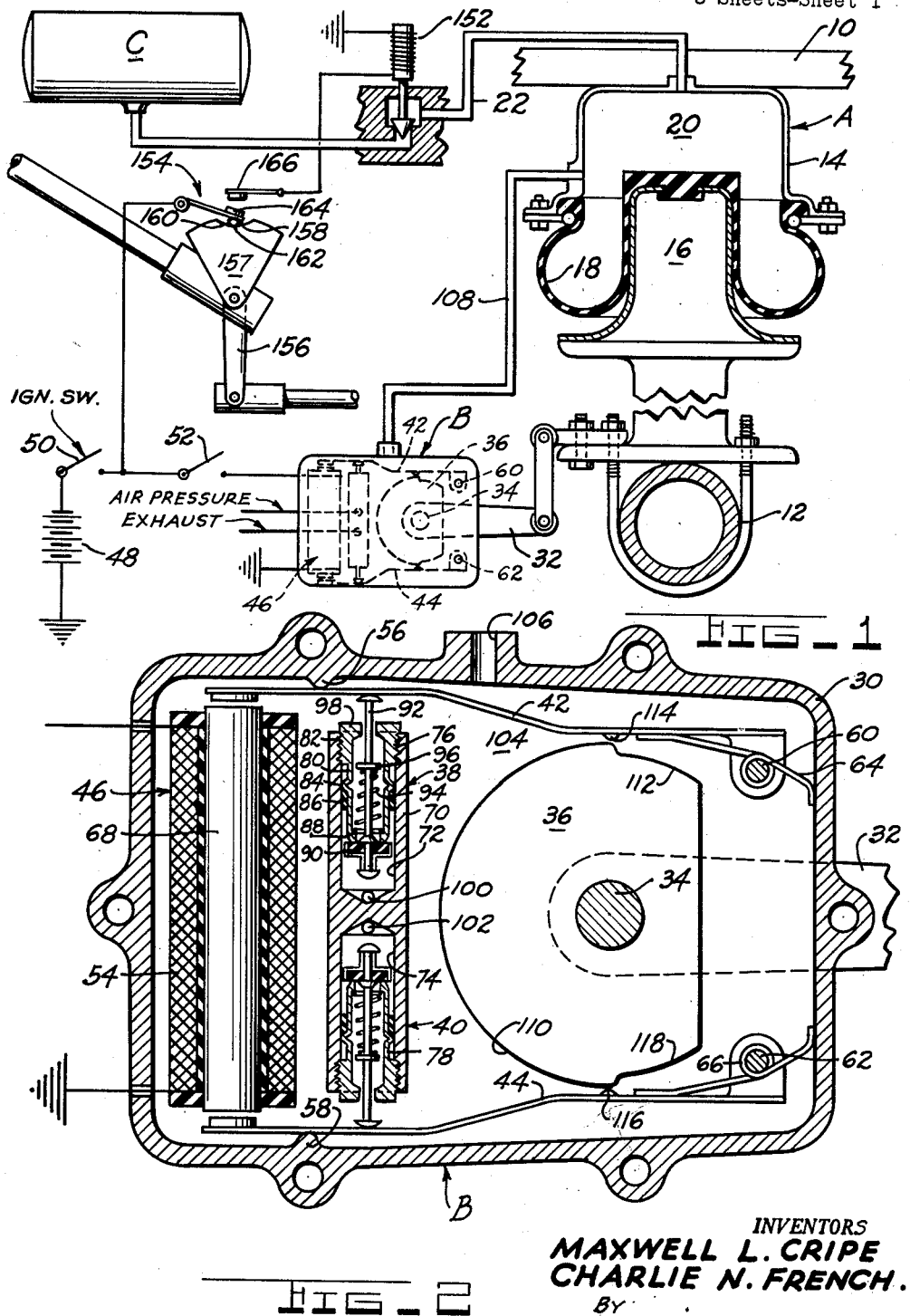
FIG_1
FIG_2
INVENTORS
MAXWELL L. CRIPE
CHARLIE N. FRENCH.
BY
William P. Hickey
ATTORNEY.

Jan. 12, 1965   M. L. CRIPE ETAL   3,165,327
LEVELING VALVE
Filed Oct. 2, 1961   3 Sheets-Sheet 2
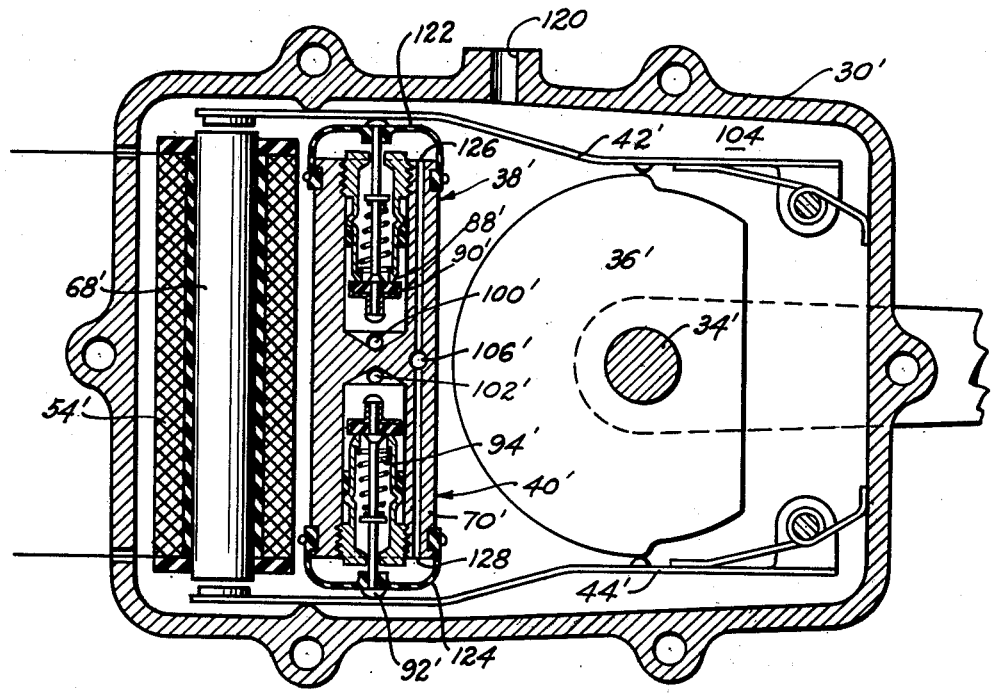
FIG_3
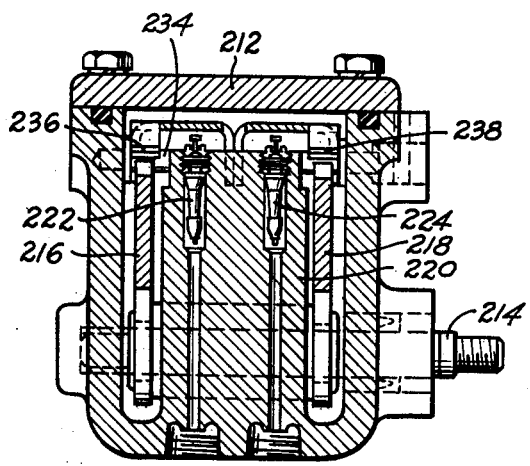
FIG_6
INVENTORS
**MAXWELL L. CRIPE.
CHARLIE N. FRENCH.**
BY
*William P. Hickey*
ATTORNEY.

Jan. 12, 1965    M. L. CRIPE ETAL    3,165,327
LEVELING VALVE
Filed Oct. 2, 1961    3 Sheets-Sheet 3
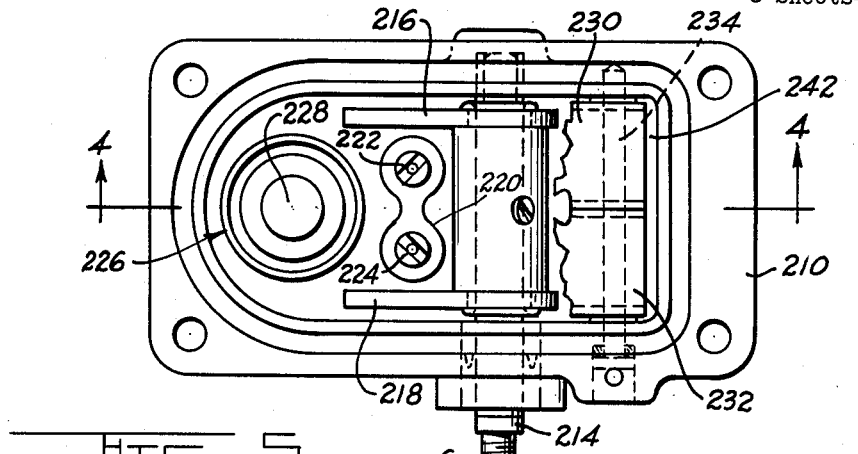
FIG_5
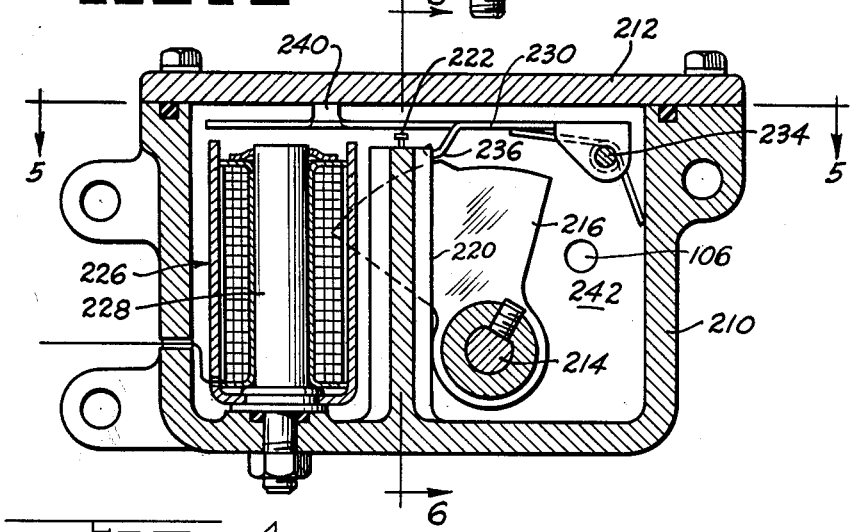
FIG_4
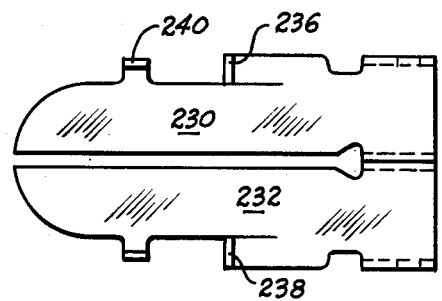
FIG_7
INVENTORS
MAXWELL L. CRIPE.
CHARLIE N. FRENCH.
BY
William P. Hickey
ATTORNEY.

United States Patent Office 3,165,327
Patented Jan. 12, 1965

3,165,327
LEVELING VALVE
Maxwell L. Cripe and Charlie N. French, both of South Bend, Ind., assignors to The Bendix Corporation, South Bend, Ind., a corporation of Delaware
Filed Oct. 2, 1961, Ser. No. 142,196
7 Claims. (Cl. 280—6.1)

The present invention relates to control structures for adjusting the relative separation between structures; and more particularly a new and improved leveling valve structure for controlling the inflation of air bags and the like in automotive vehicles.

The suspension systems which support the sprung mass from the unsprung mass of automotive vehicles are flexed many, many millions of times during the life of the vehicle and are subject to very severe impacts and jolts. Where air bags are used to support the sprung mass from the unsprung mass, some type of leveling structure must be used which will adjust the normal position of the sprung mass from the unsprung mass for various loads which the vehicle will be called upon to carry. Any sensing structure therefore which is connected between the sprung and unsprung masses and which will be used to adjust the pressure in the air bag structures will be subjected to millions and millions of oscillations during the vehicle life, and must be capable of accommodating extreme degrees of movement which at times will have considerable force and impact.

An object of the present invention is the provision of a new and improved leveling structure for an air suspension system and the like, which will be simple and inexpensive to manufacture, which will accommodate great degrees of movement without undue force upon the structure, and which will be sufficiently wear resistant to be capable of withstanding the tremendous amount of flexure which takes place in the suspension system during the life of an automotive vehicle.

A more specific object of the present invention is the provision of a new and improved leveling valve for suspension systems and the like which is interconnected between the sprung and unsprung masses by means of a lever system designed so that movement between the sprung and unsprung masses merely rotates a shaft in the leveling valve structure which in turn operates a cam and cam follower mechanism which in turn operates a control mechanism.

A further object of the present invention is the provision of a new and improved leveling valve structure of the above described type wherein the cam follower is normally biased out of engagement with the cam surface so that normally no wear of the cam and cam follower occurs, and wherein the cam follower is only periodically actuated and brought into engagement with the cam to adjust the position between the sprung and unsprung masses.

A still further object of the present invention is the provision of a new and improved leveling valve structure of the above described type wherein a pressure valve and an exhaust valve are operated by means of a pair of cam followers having a solenoid winding which simultaneously actuates both cam followers and their attendant valve structures.

A still further object of the present invention is the provision of a new and improved leveling valve structure of the above described type wherein the solenoid and cam followers are arranged to provide a closed magnetic circuit and thereby improve the efficiency of its electromagnetic structure.

The invention resides in certain constructions and combinations and arrangements of parts; and further objects and advantages will become apparent to those skilled in the art to which the invention relates from the following description of several preferred embodiments described with reference to the accompanying drawings forming a part of this specification, and in which:

FIGURE 1 is a schematic view of an automotive air suspension system in which a leveling valve embodying principles of the present invention is incorporated;

FIGURE 2 is a cross sectional view through the leveling valve shown in FIGURE 1;

FIGURE 3 is a cross sectional view similar to FIGURE 2 but showing a slightly different embodiment of leveling valve structures.

FIGURE 4 is a longitudinal cross sectional view of another leveling valve embodying principles of the present invention;

FIGURE 5 is a cross sectional view taken approximately on the line 5—5 of FIGURE 4;

FIGURE 6 is a cross sectional view taken approximately on the line 6—6 of FIGURE 4; and FIGURE 7 is a plan view of a pair of cam followers seen in FIGURES 4 and 6.

The air suspension system shown in the drawings generally comprises: an air bag A which is interpositioned between the frame 10 of the vehicle and the axle 12 of an automotive vehicle to normally resiliently support the body a predetermined distance above the axle; a leveling valve B which admits and exhausts air pressure from the air bag A to control the level of the frame 10 above the axle 12; and a reservoir C whose internal volume is normally communicated to the air bag A and which is valved off from the air bag A when inertia forces vary the loading upon the air bag A.

The air bag A may be of any suitable design, and as shown generally comprises an inverted can or cylinder member 14 carried by the frame 10, and a piston member 16 which is fastened to the axle 12 and which is suitably guided to move in and out of the cylinder member 14 to absorb road shocks etc. during operation of the vehicle. A suitable rubber diaphragm 18 is positioned over the top of the piston member 16 with its outer edge suitably sealed to the lower edge of the cylinder member 14. The internal volume 20 of the air bag A is suitably proportioned so that it amounts to approximately one-half of that required to be pressurized by the piston member 16 in order to produce the desired spring rate between the body and axle of the vehicle. The remainder of the volume which is necessary to provide the desired spring rate is provided by means of the reservoir C whose internal volume is normally connected to that of the cylinder member 14 by means of the pneumatic interconnecting line 22. During normal operation of the vehicle, therefore, inward movement of the piston 16 is free to pressurize both the volume 20 within the cylinder member 14 of the air bag A and the volume of the reservoir C.

Inasmuch as the load which is carried by a vehicle varies from time to time, a leveling valve B is provided to periodically vary the normal pressure carried by the air bag A and reservoir C to thereby maintain the spacing between the frame 10 and the axle 12 substantially a predetermined distance apart.

The spacing of the frame 10 and axle 12 is normally sensed by a suitable leverage system. The prior art sensing structures with which I am familiar transmit actuating force to suitable control valve structures through spring arrangements so that extreme movements between the axle and frame will not damage the operated control valve structures. Where the movement between the axle and frame is used to actuate the control mechanism directly through such spring structures, the spring structures are continually flexed, and shocks from the axle are still transmitted through the spring mechanisms to the control valve structures.

According to principles of the present invention, the cast iron housing 30 of the leveling valve B is suitably affixed to the frame 10 of the vehicle, and a suitable leverage system 32 is suitably interconnected between the axle 10 and the housing 30 to rotate a shaft 34 which is suitably journalled in the housing 30. Rotation of the shaft 34 is not used directly to actuate any control mechanisms but in turn is used to rotate suitable cam structures for operating inlet and outlet valving for the air bag A. In some instances, a single valve structure can be used to control both the inflation and deflation of the air bag A in which case only one cam surface and follower need be used to actuate the valve mechanism. Poppet type valves however have the advantage of providing a positive sealing action wherein no leakage occurs; and separate poppet valves 38 and 40 can be easily incorporated to control the inflation and deflation of the air bag A by providing separate cam surfaces and cam followers for the respective poppet valves. The necessary camming surfaces can be provided by separate cams which are spaced axially upon the shaft 34; but as shown in the drawing are preferably on spaced apart portions of the same cam structure 36.

In some instances, cam followers 42 and 44 can be suitably connected and biased against the valve structures and against the camming surface so as to continually actuate the supply and relief valve structures 38 and 40 as the cam structure 36 is rotated. If this were to be done, however, there would be a continual flow of air to and out of the air bags A as the vehicle moves over uneven road surfaces. According to principles of the present invention, cam followers 42 and 44 are not biased against the inlet and outlet valve structures 38 and 40 with sufficient force to normally operate the valves; and instead, separate means are provided to move the followers 42 and 44 against the valve structures and against the camming surface 36 only during the times that the vehicle is being loaded or unloaded. This is accomplished in the embodiment shown in the drawings by means of suitable solenoid means 46 which is connected in electrical series circuit through the battery 48, ignition switch 50 and a door switch 52 (which switch 52 is open when the door is closed) to energize the solenoid means 46 when the door is open. One or more switch means can be used on one or more door structures and it has been found that the leveling valve can be satisfactorily operated by a single door switch actuated by the door through which the driver of the vehicle gains ingress and egress.

According to further principles of the present invention, cam followers 42 and 44 can be operated by means of a single solenoid winding 54 which will produce a north pole in one of the cam followers and a south pole in the other of the cam followers; and the cam followers 42 and 44 can be suitably constructed and connected to the cast iron housing 30 so as to provide a closed magnetic loop having good electromagnetic efficiency.

According to other principles of the present invention, wear between the cam followers 42 and 44 and their actuating cam structures 36 can be practically eliminated by normally supporting the cam followers out of engagement with the cam structures 36, so that during motion of the vehicle no rubbing action occurs between the camming surface and the camming followers. The structure is preferably arranged, so that the cam followers 42 and 44 are brought down upon the cam structure 36 only when the solenoid winding 54 is energized to sense the cam's position and operate the valves 38 and 40 accordingly. Cam followers 42 and 44 may be formed as part of suitable leaf spring structures whose ends are fixed to the housing 30 in such manner that the cam followers 42 and 44 bias themselves outwardly away from the cam structure 36 and into engagement with suitable stops 56 and 58 positioned so as to prevent the air gap between cam followers and the solenoid means 46 from becoming excessive.

As shown in the drawing, however, cam followers 42 and 44 are formed as rigid structures which are suitably journalled on pins 60 and 62 carried by the housing 30; and the cam followers are biased outwardly in engagement with the stops 56 and 58, formed as integral portions of the housing 30, by means of suitable coil springs 64 and 66 respectively. The solenoid winding 54 has a suitable soft iron core 68 running therethrough, and suitably insulated from the winding 54 to provide north and south poles toward which the cam followers 42 and 44 are attracted.

As previously mentioned, the supply and exhaust valve structures 38 and 40 may be formed in any suitable manner; and as shown in the drawings are formed in opposite ends of a body member 70 which extends between the cam followers 42 and 44, and which is sealingly fixed to the sidewalls of the housing 30. Opposite ends of the body member 70 are suitably bored out as at 72 and 74 and threaded at their outer ends to receive the tire valve cores 76 and 78 respectively. The valve cores 76 and 78 are identical in construction so that identical numbers apply for each valve core. The valve cores generally comprise a small tubular body 80 and the outer end of which is threaded at 82 to the body member. The tubular body 80 is upset inwardly of the threads 82 to provide a flange against which a rubber gasket 86 is bonded to effect a seal with respect to respective receiving bores 72 or 74. The inner end of the tubular body 80 forms a valve seat 88 against which a rubber filled cup-shaped poppet 90 abuts for closing off flow through the valve structure. Cup-shaped poppet 90 is sealingly fixed to a valve stem 92 which extends through the tubular body from the poppet member 90 and projects out of its opposite end where it is contacted by the cam follower to lift the poppet 90 from its valve seat 88. Poppet 90 is biased against the valve seat by means of a suitable coil spring 94 which extends between a suitable shoulder on the side of the tubular body 80 and a flange 96 on the valve stem 92. Valve stem 92 is suitably guided adjacent the outer end of the tubular body 80, and a pair of in-line projections 98 only one of which is shown are formed integrally in the outer end of the tubular body to provide suitable means by which the tubular body may be screwed into position in its receiving bore. A high pressure air supply is communicated to the bottom of the bore 72 by means of an inlet port 100, and the bottom of the other bore 74 is communicated to the atmosphere through an exhaust port 102. The outer ends of each of the tire valve cores are communicated to the internal chamber 104 of the housing 30. Suitable pressure seals are provided between the housing 30 and the shaft 34, as well as around the electrical wires to the solenoid winding 54; so that the housing 38 is air tight except for its outlet connection 106 which is communicated to the air bag structure by means of the pressure conduit 108.

The cam structure 36 has diametrically opposite areas or surfaces which cooperate and actuate the respective cam followers 42 and 44. When the frame 10 is positioned at the right height above the axle 12, the lever system 32 will be approximately centered as will the cam 36, so that high areas of the cam are in a position to be abutted by both of the cam followers 42 and 44. As the frame 10 moves from this normal position toward the axle 12, shaft 34 and consequently cam 36 rotate in a counterclockwise direction as seen in FIGURE 2 to cause the high area 110 to remain in a position for engagement with the exhaust cam follower 44 while the low area 112 is rotated into position for engagement by the high pressure valve follower 42. This condition may well occur when the vehicle is stopped and the vehicle is being loaded, and if at this time the driver's door should be open, solenoid winding 54 will be energized to pull the cam follower 42 downwardly. Inasmuch as the low area 112 lies beneath its abutting portion 114, the cam follower 42 is free to move downwardly by an amount which pushes the valve stem 92 inwardly to lift the poppet 90 away from the valve seat 88 thereby cause air pressure to flow into the leveling out chamber 104 and hence to the air bag A. Increase air pressure within the chamber 20 causes the frame 10 to move upwardly away from the axle 12. During this movement, the cam 36 is rotated clockwise to again bring its high surface area 110 into engagement with the abutted portion 114 of the cam follower 42 to move the cam follower 42 outwardly to a position where the poppet member 90 again abuts the valve seat 88. No further inflation therefore occurs in the air bag A. It should be understood that there will generally be four such air bags A and four such leveling valves—one adjacent each wheel of the vehicle. Thereafter when the driver closes his door, the solenoid winding 54 will be deenergized allowing the cam followers 42 and 44 to move outwardly into engagement with the respective abutments 56 and 58. During the loading of the vehicle, the high cam area 110 remained beneath the abutting portion 116 of the cam follower 44 so that the exhaust valve structure 40 could not be operated.

When the vehicle is stopped and an unloading occurs, the frame 10 will move upwardly away from the axle 12 to rotate the cam 36 clockwise as seen in FIGURE 2. Clockwise rotation of the cam 36 maintains the high cam area 110 beneath the abutting portion 114 of the cam follower 42 and at the same time rotates the low cam area 118 beneath the abutting portion 116 of the exhaust cam follower 44. If the driver's door is open at this time, solenoid winding 54 is energized to draw both of the cam followers 42 and 44 into engagement with the camming surface. Inasmuch as the high cam area 110 is beneath the abutting portion of the high pressure cam follower 42, high pressure valve 38 will not be actuated and the abutting portion 116 will move inwardly into engagement with the low area 118 to open the exhaust valve structure 40 and thereby exhaust pressure from the air bag 20. As the pressure in the air bag chamber 20 decreases, frame 10 descends closer towards the axle 12 to rotate the cam 36 counterclockwise and thereby bring the high cam area 110 in registry with the abutting portion 116 of the exhaust cam follower 44 to ride the cam follower 44 outwardly to a position allowing the exhaust valve structure 40 to close. Thereafter when the driver's door is closed again, the solenoid winding 54 is deenergized to allow the cam followers 42 and 44 to again move outwardly into engagement with the abutments 56 and 58 respectively.

The embodiment of leveling valve structure as shown in FIGURE 3 is generally the same as that shown in FIGURE 2 and differs principally therefrom in that the chamber 104 is vented to atmosphere through the port 120 and the control port 106' is connected directly to the air bag A. Those portions of FIGURE 3 which correspond to similar portions in FIGURE 2 are designated by a like reference numeral characterized further in that a prime mark is affixed thereto. Suitable diaphragm sealing structures 122 and 124 are provided on the end of the high pressure valve 38' and the low pressure valve 40' to effect a seal between their valve stems 92' and the valve body member 70'. Suitable drilled passageways 126 and 128 communicate the control port 106' with the control valve areas inside of diaphragms 122 and 124. Inasmuch as the diaphragms 122 and 124 are larger than the valve seats 88' there is always a force tending to hold the poppet members 90' against the valve seats 88' to provide a positive seating action. By means of the arrangement shown in FIGURE 3, the housing member 30' need not be air tight and there need not be a suitable seal provided between the shaft 34' and the housing 30'.

As previously indicated, it is intended that there will be provided an air bag A, a leveling valve B and a reservoir C adjacent each wheel of the vehicle. The suspension system shown in FIGURE 1 includes means for valving off the reservoir C from the air bags A during a cornering of the vehicle so that the suspension system will be stiffened up during a turn to reduce roll of the frame 10. It will be understood that only one such arrangement is shown in the drawings. The system shown in FIGURE 1 includes normally open solenoid valves 152 which are positioned in the interconnecting lines 22 between the reservoirs C and the air bags A to normally communicate the same, and to valve off the reservoirs C from the air bags A during a cornering of the vehicle. The solenoid valves 152 are controlled by a suitable switch mechanism 154 that is operated by the vehicle steering mechanism, and which is normally open when the steering mechanism is adjusted for vehicle straight-line motion, and which is closed whenever the steering mechanism is moved out of its normal position to produce a cornering of the vehicle. The switch mechanism shown in the drawing includes a cam 157 suitably affixed to the pivotal shaft which extends out of the gear box at the base of the steering column, and which rotates the pitman arm 156 that operates the drag links etc., which in turn corner the vehicle. The cam 157 has a centrally located depression in its camming surface 160—which depression 158 is adapted to receive the engagement point of the cam follower 162. Cam follower 162 is suitably electrically insulated from the surrounding structure and is provided with an electrical contact 164 which is adapted to close with respect to the cooperating electrical contact 166 of the switch when the cam follower 162 rides up out of the depression 158 of the camming surface 160. The cam follower 162 is electrically connected to the ignition switch 50 of the vehicle, and the contact 166 is electrically connected to the four solenoids 152 which are provided on the vehicle. When the steering wheel of the vehicle is turned in either direction, the cam 157 is rotated causing the contact 164 to engage the contact 166 and thereby energize the solenoids 152 to valve off the reservoirs C from their respective air bags 14. By use of this arrangement, the spring rate of all of the air bags are increased to simultaneously increase the resistance to compression of the air within the chamber 20 to considerably reduce the amount of roll which is permitted during the cornering of the vehicle.

The embodiment of leveling valve shown in FIGURES 4 through 7 generally comprises a cast iron housing 210 having a cover 212 which forms an air tight assembly. The housing section 210 is provided with a horizontal shaft 214—which shaft is adapted to be rotated by the leverage system 32 shown in FIGURE 1. A pair of cams 216 and 218 is provided at opposite ends of the shaft 214 in such manner that the cams 216 and 218 straddle a valve body 220 which contains a pair of parallel pressure and exhaust valves 222 and 224. The valves are constructed in an identical manner to that seen in the embodiment of FIGURE 2. On the side of the valve body 220 opposite from the shaft 214 is located a solenoid 226 having a soft iron core 228, the bottom of which is suitably fastened to the housing 210. The top of the core 228 forms a pole piece for contact or engagement by a pair of cam followers 230 and 232. One end of the cam followers 230 and 232 are so arranged that each overlies approximately one-half of the pole piece, while the other ends of the cam followers are suitably journalled upon a cross pin 234 in the housing member 210. The cam followers 230 and 232 respectively overlie the pressure and exhaust valves 222 and 224; and each has a side depending portion 236 and 238 respectively which lies over the respective cams 216 and 218 to be actuated thereby. Each of the cam followers 230 and 232 are biased upwardly away from the solenoid pole piece 228 by means of a suitable coil spring, as was done in the previously described embodiments so that their bent tabs 240 abut the cover member 212. The cams 216 and 218 are formed so that they have a high portion which engages the respective followers 236 and 238 in a normal position of the shaft 214. High pressure cam 216 is so shaped as to provide a low area just clockwise of the portion contacted by the follower 236 in the normal position of the shaft; while the low pressure cam 218 is provided with a low area just counterclockwise of the position of the cam contacted by the follower 238 in the normal position of the shaft 214. As in the previous embodiment, therefore, the cam followers 236 and 238 are arranged to be just out of engagement with the respective cams when the abutment tabs 240 on the cam followers engage the cover 212.

The embodiment shown in FIGURES 4 through 7 operate in much the same manner as that described in previous embodiments. Upon a lowering of the frame 10 towards the axle 12 during a loading of the vehicle when the driver's door is open cam 216 is rotated counterclockwise so that a low area lies beneath the cam follower 236. If the driver's door is open at this time, solenoid 226 is energized to draw the cam follower 230 downwardly to a position operating the high pressure valve 222 to bleed air pressure into the air tight chamber 242 within the body member 210. This of course is communicated to the actuated air bags through the line 108, as described for the previous embodiments, to inflate the bag 20 and thereby rotate the shaft 214 to cam the follower 230 out of engagement with the pressure valve 222. During an unloading of the vehicle, the shaft 214 rotates clockwise to bring a low area of the cam 218 beneath its follower portion 238. If the driver's door is open at this time, the solenoid 228 will be energized to draw the follower 232 downwardly to operate the exhaust valve 224 to bleed air out of the internal chamber 242. As the frame 10 approaches the axle 12, the shaft rotates counterclockwise to cam the follower 232 out of engagement with the exhauts valve 224 when it gets to its normal position, thereby maintaining the vehicle in its normal suspended position.

It will be apparent that the objects heretofore enumerated as well as others have been accomplished and that there has been provided a new and improved control mechanism for adjusting the position between two reciprocable members—and which control structure is extremely rugged, efficient in its operation, and economical manufacture.

While the invention has been described in considerable detail, I do not wish to be limited to the particular constructions shown and described; and it is my intention to cover hereby all novel adaptations, modifications, and arrangements thereof which come within the practice of those skilled in the art to which the invention relates.

We claim:

1. In a vehicle having a body whose weight is supported from the undercarriage of the vehicle by an air bag: a reservoir of pneumatic pressure for communication to said air bag, a valve for controlling the pneumatic pressure in said air bag, and a switch for controlling said valve, said switch comprising a rotatable cam whose angular position is controlled by the relative position of said body and undercarriage, a pair of cam followers positioned on opposite sides of said cam, a pressure inlet valve and an exhaust valve for said air bag, said valves being positioned between said cam followers and each of which are opened by a respective cam follower when said cam permits the respective follower to move towards the other follower from a normal position, and solenoid means which biases both followers towards each other when energized, said cam normally preventing said followers from operating said valves when said body and undercarriage are normally spaced, permitting said pressure valve to be opened when said body and undercarriage are at less than their normal spacing, and permitting said exhaust valve to be opened when said body and undercarriage are at more than their normal spacing.

2. In a vehicle having a sprung mass supported from an unsprung mass by means of an air bag and the like and in which said sprung and unsprung masses have a normal spaced apart condition: a leveling valve housing supported by one of said masses, a rotatable shaft journalled in said housing and rotated by means of a connection to the other of said masses in a manner changing the angular position of said shaft in accordance with the spacing between said masses, a cam supported and rotated by said shaft, said shaft having a normal position corresponding with the normal spacing between said sprung and unsprung masses, a pair of cam followers respective ones of which are adapted to abut spaced apart portions of said cam, said spaced apart cam portions having high surface areas adapted to engage respective cam followers when said shaft is in its normal position, one of said cam portions having a lower surface area spaced in the direction of shaft rotation from its high surface area produced by the movement of said sprung and unsprung masses towards each other, and the other of said cam portions having a low surface area spaced in the opposite direction of shaft rotation from its high area; a single solenoid winding between said cam followers for moving both followers towards said cam, said solenoid forming a closed magnetic circuit with said cam followers, abutment means limiting movement of said cam followers away from said cam to a position wherein said followers no longer engage said cam, said cam followers being formally biased into engagement with said abutment means and out of engagement with said cam when said solenoid is deenergized, a high pressure control valve actuated by movement of one of said cam followers during its movement from said high area to said low cam area for bleeding pressure to said air bag, an exhaust valve structure for bleeding air out of said air bag during movement of said other of said cam followers from its high cam area to said low cam area, and means for energizing said solenoid to level said vehicle.

3. A leveling valve comprising:
   a housing;
   a shaft journalled in said housing;
   cam means on said shaft, said cam means having a high surface portion spaced at a large radial distance from said shaft and a low surface portion spaced at a small radial distance from said shaft;
   a pair of cam followers adapted for independent operation on said cam means, each of said cam followers having a portion adapted to abut said surface portions of said cam means;
   an abutment limiting movement of said followers away from said cam surface portions arranged such that when said followers are resting thereagainst said portion of said followers are not in engagement with said cam surface portions;
   a solenoid operated means for moving said followers into engagement with said cam means;
   a means for biasing said followers against said abutment means for returning said followers when said solenoid operated means is deenergized whereby said followers only rub on said cam means when said solenoid operated means is actuated; and
   a valve means having independent valves arranged to be operated by respective followers as said portion of said followers move toward said low surface portion positioned at a small radial distance from said shaft, said valves being prevented by said cam means from being actuated when said followers abut said cam portion positioned at a large radial distance from said shaft.

4. A leveling valve and the like comprising: a housing, a shaft journalled in said housing, said shaft having a neutral position from which it rotates in opposite directions, cam means on said shaft, a solenoid winding on said housing, a pair of cam followers each having an abutment portion for engaging said cam means, said cam means having a pair of surface portions respective ones of which cooperate with respective ones of said pair of cam followers, each of said cam surface portions having high and low areas, said cam surface portions being arranged so that said high portions of each pair are registered for abutment by both cam followers when said shaft is in said neutral position and rotation of said shaft in one direction from its neutral position moves a low area of one cam portion in registry with one cam follower while said high portion of said other cam portion registers with said other cam follower, and shaft rotation in the opposite direction of said neutral position maintains a high area of said one cam portion in registry with its follower and a low area of said other cam portion is brought into registry with said other cam follower, said cam followers being arranged to overlie said solenoid winding, and a pair of valves arranged in said housing between said cam followers such that respective ones of which are actuated by movement of a respective cam follower from its high area to its low area while the other of said valves is being held from actuation by movement of a respective cam follower on the high area of said cam means.

5. A leveling valve and the like comprising: a housing, a shaft journalled in said housing, said shaft having a neutral position from which it rotates in opposite directions, cam means on said shaft, a solenoid winding on said housing, a pair of cam followers each having an abutment portion for engaging said cam means, said cam means having a pair of surface portions respective ones of which cooperate with respective ones of said pair of cam followers, each of said cam surface portions having high and low areas, said cam surface portions being arranged so that said high portions of each pair are registered for abutment by both cam followers when said shaft is in said neutral position and rotation of said shaft in one direction from its neutral position moves a low area of one cam portion in registry with one cam follower while said high portion of said other cam portion registers with said other cam follower, and so that shaft rotation in the opposite direction of said neutral position maintains a high area of said one cam portion in registry with its follower and a low area of said other cam portion is brought into registry with said other cam follower, said cam followers being arranged to overlie said solenoid winding, a pair of valves respective ones of which are actuated by movement of a respective cam follower from its high area to its low area, abutment means limiting movement of said cam followers away from said cam means to a position wherein their abutment portions no longer engage said cam means, and a spring means for biasing said cam followers to normally rest against said abutment means.

6. A leveling valve and the like comprising: a housing, a shaft journalled in said housing, said shaft having a neutral position from which it rotates in opposite directions, a cam on said shaft, a pair of cam followers respective ones of which are adapted to abut spaced apart portions of said cam, said spaced apart cam portions having high surface areas adapted to engage respective cam followers when said shaft is in its neutral position, one of said cam portions having a low surface area spaced in one direction of shaft rotation from its high surface area, and the other of said cam portions having a low surface area spaced in the opposite direction of shaft rotation from its high area; a single solenoid winding between said cam followers for operating both followers to form a closed magnetic circuit with said followers, and control means for actuating said leveling valve, said control means being operated by each of said followers upon movement from the high area of its cooperating cam portion to the low area of its cooperating cam portion.

7. A leveling valve and the like comprising: a housing, a shaft journalled in said housing, said shaft having a neutral position from which it rotates in opposite directions, a cam on said shaft, a pair of cam followers respective ones of which are adapted to abut spaced apart portions of said cam, said spaced apart cam portions having high surface areas adapted to engage respective cam followers when said shaft is in its neutral position, one of said cam portions having a low surface area spaced in one direction of shaft rotation from its high surface area, and the other of said cam portions having a low surface area spaced in the opposite direction of shaft rotation from its high area; a single solenoid winding between said cam followers for operating both followers to form a closed magnetic circuit with said followers, control means for operating said leveling valve, said control means being operated by each of said followers upon movement from the high area of its cooperating cam portion to the low area of its cooperating cam portion, abutment means limiting movement of said cam followers away from said cam to a position wherein said followers no longer engage said cam, said cam followers being normally biased into engagement with said abutment means and being biased into engagement with said cam upon energization of said solenoid winding.

References Cited in the file of this patent
UNITED STATES PATENTS
2,820,647    Jackson _____ Jan. 21, 1958
FOREIGN PATENTS
569,787    Italy _____ Nov. 26, 1957